United States Patent [19]

King

[11] Patent Number: 5,133,383
[45] Date of Patent: Jul. 28, 1992

[54] AXICAGE MULTISTAGE CHOKE

[75] Inventor: Jeffrey A. King, Cypress, Tex.

[73] Assignee: Cooper Industries, Inc., Houston, Tex.

[21] Appl. No.: 761,526

[22] Filed: Sep. 18, 1991

[51] Int. Cl.⁵ .............................. F16K 47/04
[52] U.S. Cl. .................. 137/625.3; 137/625.39; 251/121; 251/282
[58] Field of Search ............. 251/282, 324, 121; 137/614.11, 625.37, 625.38, 625.39, 625.3

[56] References Cited

U.S. PATENT DOCUMENTS

| | | | |
|---|---|---|---|
| 2,692,614 | 10/1954 | McLeod | 251/324 X |
| 2,747,612 | 5/1956 | Lee | 251/324 |
| 2,854,998 | 10/1958 | MacGlashan | 251/324 X |
| 3,880,399 | 4/1975 | Luthe | 137/625.37 X |

Primary Examiner—Alan Cohan
Attorney, Agent, or Firm—Nelson A. Blish; David A. Rose

[57] ABSTRACT

An axicage multistage choke (10) wherein fluid flow is caused to impinge upon itself at each stage. Fluid entering inlet (14) is distributed by primary annulus (32) around the interior of upper cage (30). Fluid enters upper cage port (36) and impinges on itself in axial chamber (37). Fluid leaves chamber (37) through stem slots (38) into secondary annulus (42). From secondary annulus (42) fluid passes through lower cage ports (46) into axial chamber (47), again impinging on itself and dissipating energy. Fluid leaves choke (10) through outlet (16). Additional stages maybe added depending on the flow rate or pressure drop desired in the valve.

8 Claims, 2 Drawing Sheets

AXICAGE MULTISTAGE CHOKE

This invention relates to valves in general and in particular to a multistage choke valve.

BACKGROUND TO THE INVENTION

The purpose of valves and chokes is to reduce the pressure or flow rate or both of a liquid. One method of reducing the pressure has been to cause the liquid to be directed in a manner that it impinges on itself. This increases velocity by increasing the flow through an orifice which dissipates energy.

Other prior art methods of reducing pressure have had problems in that the pressure could be reduced only by a certain amount in a single stage. A prior attempt at solving this problem was to use several stages to reduce the pressure. A problem with reducing the pressure in several stages is that the prior art stages are often bulky and cumbersome and resulted in a large valve.

SUMMARY OF THE INVENTION

A choke valve according to the present invention allows a multistage pressure drop in a single valve. Flow is directed to cause impingement of the fluid upon itself at each stage. A multichamber, internal sleeve with slots allows communication between external cages and axial chambers within the sleeve. The external cages are stacked axially, with the sleeve inserted into their bores, such that each cage is ported radially at the upper section to route fluid into the sleeve. The lower portion of each cage forms an annulus to direct fluid to the next stage. The cages are modular and identical segments can be stacked according to the number of stages required. The sleeve can be moved axially to allow flow for adjustable throttling.

At each stage, flow enters the cage ports from the adjacent annulus and is throttled as it passes through the sleeve slots. The flow impinges on itself inside the upper portion of the sleeve chamber, then flows out the chamber through the lower end of the slots and into the cage annulus. The annulus directs the fluid to the next set of cage ports, and the process is repeated.

DETAILED DESCRIPTION

Figure 1:
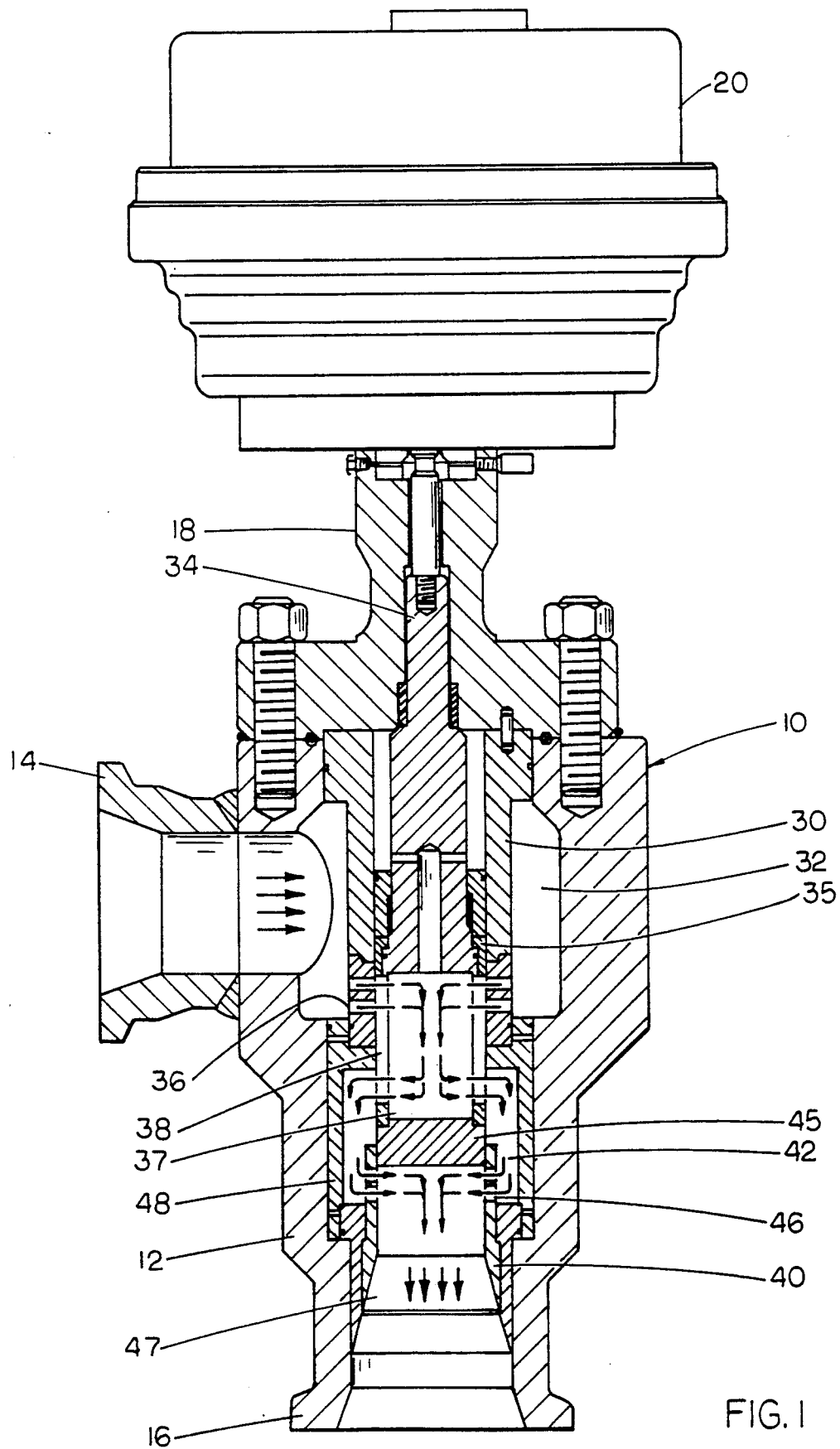
FIG. 1 is a cross sectional view of a two stage axicage multistage choke according to the present invention.
Figure 2:
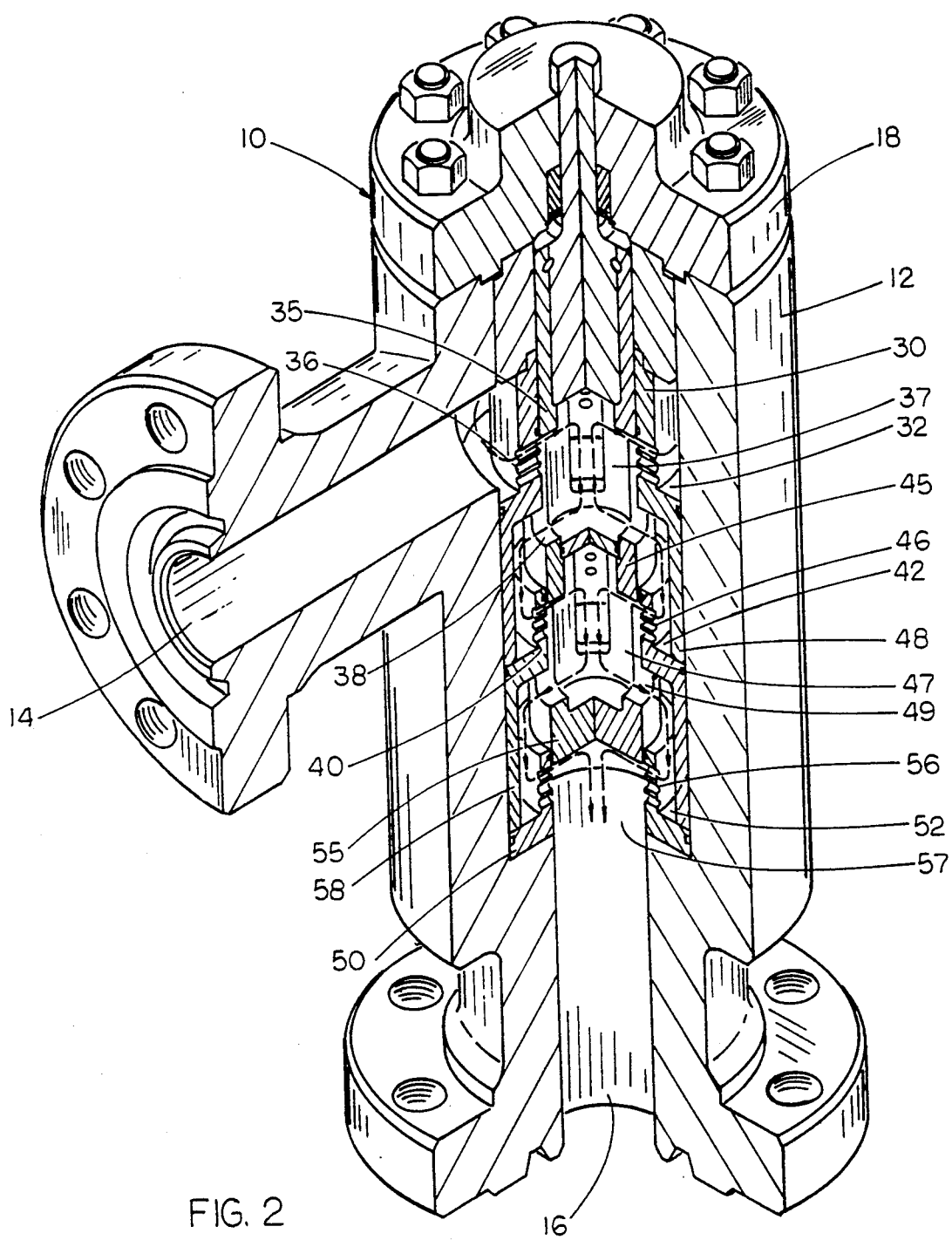
FIG. 2 is a three dimensional perspective view, partially in section, of a three stage axicage multistage choke according to the present invention.

A axicage multistage choke according to the present invention is shown in FIG. 1 and FIG. 2 and referred to in general by 10. The major components of 10 are actuator 20, bonnet 18, and choke body 12.

Actuator 20 may be hydraulically or electrically operated as is well know in the art. Stem 34 is movable by actuator 20 or handwheel.

In the closed position, with the stem 34 fully down, lower trim 45 covers lower cage ports 46 in lower cage 40, upper trim 35 covers upper cage ports 36 in upper cage 30 in a like manner.

When opening valve 10, stem 34 moves up, upper trim 35 clears upper ports 36, and lower trim 45 clears lower ports 46. Liquid flows into valve 10 through inlet 14 around the primary annulus 32 and into ports 36. Ports in both the upper cage 30 and lower cage 40 are always 180° opposite and always in pairs, so that flow into the axial chamber causes the flow to impinge on itself. The number of pairs of ports depends on the flow capacity and the pressure drop desired in the valve.

Fluid flows from ports 36 into axial chamber 37. The effect of the fluid from cage 30 impinging on itself in first axial chamber 37 is to cause a change in the flow rate or a pressure drop. This dissipates energy that can cause damage in other multistage valves without impinging flow.

Fluid flows from axial chamber 37 through stem slots 38 into secondary annulus 42. From secondary annulus 42, fluid flows into lower cage ports 46 in lower cage 40 and impinges on itself in second axial chamber 47. Flow then exists valve through outlet 16.

FIG. 2 shows a third stage producing an additional pressure drop. Flow through the third stage in FIG. 2 is similar to the flow through stage 1 and stage 2. Flow exiting from stage 2 through slots 49 passes into annulus 52, ports 56, into axial chamber 57, to impinge upon itself an additional time.

It will be understood by those skilled in the art that there are other variations which fall within the scope of the claims of the invention. For example, the ports in each stage may be provided in groups of threes rather than in pairs so long as the ports are equally spaced around the circumference so that the flows impinge upon themselves at a balanced manner at the center of the axial chamber. Thus, if ports were provided in sets of three, they would be spaced around the circumference at 120° from each other. Ports provided in sets of four would be spaced at 90° from each proceeding set of ports and so on. Also fluids as used is meant to include both liquids and gas.

I claim:

1. A valve for fluid pressure drops comprising:
   a valve body having an inlet for receiving fluid in said valve;
   said valve body having an axial aperture therethrough and a primary annulus in flow communication with said inlet for directing flow into said axial aperture of said valve;
   first and second cages coaxially disposed within said axial aperture of said valve body and having a bore therethrough;
   a stem reciprocably disposed within said bore and having a first chamber located approximately on the center line of said valve;
   said first cage sealing said primary annulus from said axial aperture and including first ports for directing flow from said primary annulus to said first chamber when said stem is in an open position wherein said flow is directed such that it impinges on itself;
   said second cage having a secondary annulus;
   said stem including stem slots around said chamber allowing fluid flow therethrough for directing fluid from said first chamber in a radial and outward direction to said secondary annulus;
   a second chamber formed in said axial aperture adjacent one terminal end of said stem;
   said second cage having second ports for directing fluid from said secondary annulus to said second chamber when said stem is in the open position wherein said fluid is directed in such a manner that it impinges on itself; and
   said stem having a closed position where said stem prevents flow through said first and second ports.

2. A valve as in claim 1 wherein said first ports are arranged in opposed pairs spaced approximately 180° from each other.

3. A valve as in claim 1 wherein said second ports are arranged in opposed pairs spaced approximately 180° from each other.

4. A valve as in claim 1 wherein said first ports are provided in opposed sets such that flow from each opposed set of ports impinges upon itself in said first chamber in a balanced manner.

5. A valve as in claim 1 wherein said second ports are provided in opposed sets such that flow from each opposed set of ports impinges upon itself in said second chamber in a balanced manner.

6. A valve as in claim 1 wherein said stem is connected to a first trim and to a second trim such that when said stem is moved to the closed position said first trim covers said first ports and said second trim covers said second ports.

7. A valve for reducing fluid flow comprising:
a valve body having an axial passage therethrough and an inlet for allowing fluid entry;
a stem disposed within said axial passage reciprocable between an open position allowing fluid flow through said axial passage and a closed position preventing fluid flow through said axial passage;
a plurality of stages where fluid pressure is reduced at each stage by causing a set of a plurality of jets of the fluid to meet and impinge on each other at the axis of said axial passage thereby dissipating the energy of said fluid;
a first stage where pressure is reduced by causing said fluid to flow from said inlet through a set of restricting orifices in said valve body directing the fluid to the axis of said axial passage in a first chamber of said stem causing the jets of the fluid to impinge upon themselves at the axis in a radial fashion thereby dissipating energy; and
said first chamber in said stem directing the fluid to a second stage wherein the fluid from said first stage is redirected through a second set of restricting orifices in said valve body causing the jets of the fluid to impinge upon themselves at the axis of said axial passage in a radial manner a second time.

8. A valve as in claim 7 wherein said second set of restricting orifices of said second stage directs said jets of the fluid to the axis of said axial passage located in a second chamber in said stem; and further including a third stage where fluid is received from said second chamber and is redirected through a third set of restricting orifices in said valve body causing the jets of that fluid to impinge on themselves at the axis of said axial passage in a radial manner a third time.

* * * * *